C. F. NICKERSON.
TIRE SHOE FOR VEHICLE WHEELS.
APPLICATION FILED MAR. 13, 1915.
1,184,258.
Patented May 23, 1916.
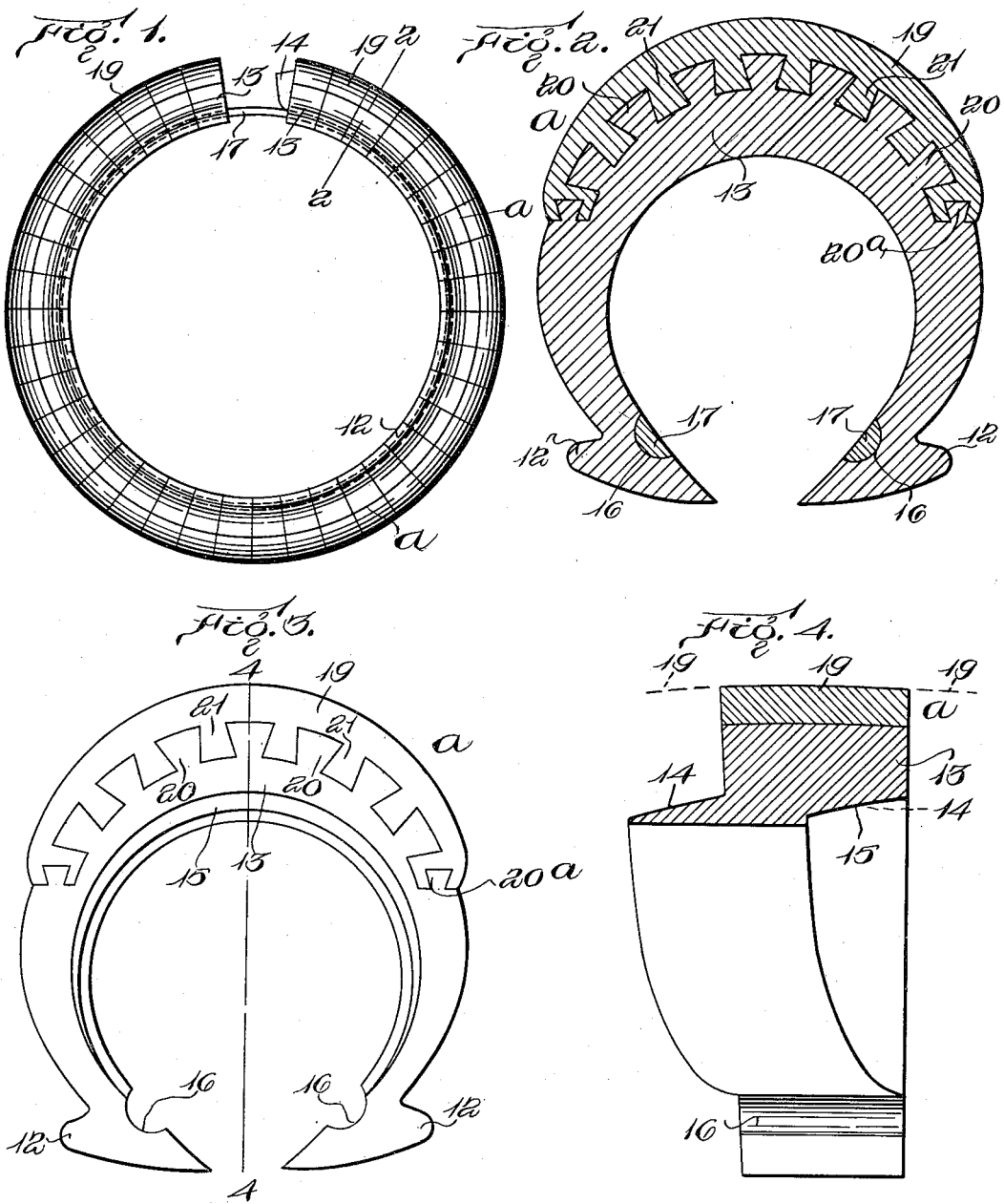

UNITED STATES PATENT OFFICE.

CHARLES F. NICKERSON, OF READING, MASSACHUSETTS.

TIRE-SHOE FOR VEHICLE-WHEELS.

1,184,258.   Specification of Letters Patent.   Patented May 23, 1916.

Application filed March 13, 1915. Serial No. 14,098.

*To all whom it may concern:*

Be it known that I, CHARLES F. NICKERSON, a citizen of the United States, and resident of Reading, in the county of Middlesex and State of Masachusetts, have invented certain new and useful Improvements in Tire-Shoes for Vehicle-Wheels, of which the following is a specification.

This invention relates to a tire shoe or carcass which incloses an annular cushion such as an inflated inner tube or a solid rubber cushion, the shoe being provided with the usual or any suitable faces at its base portion for detachable engagement with fastening devices on a wheel rim.

The chief object of the invention is to provide a shoe, which, while sufficiently flexible or elastic to be detachably secured to a wheel rim and to yield with the inclosed cushion under the load, is provided with a wear-resisting tread of relatively rigid non-puncturable material, and is composed of tread units, each flexibly supported and each having sufficient freedom of independent movement toward and from the axis of rotation to insure the desired flexibility or resilience of the tread as a whole.

Another object of the invention is to provide a shoe of sectional construction, the sections of which include tread units, flexible body units rendered relatively rigid by the tread units, and edge portions of unimpaired flexibility having units of the faces which detachably engage the usual fastening devices on the wheel rim, said sections being detachably connected in a continuous circular series, and each being removable and renewable in the event of a puncture, blow-out or other accident rendering it useless.

To these and other related ends the invention consists in the improvements which I will now proceed to describe and claim.

Of the accompanying drawings forming a part of this specification: Figure 1 represents a side view of a shoe embodying my invention, two of the sections being removed; Fig. 2 represents a section on line 2—2 of Fig. 1; Fig. 3 represents an end view of one of the sections; Fig. 4 represents a section on line 4—4 of Fig. 3.

The same reference characters indicate the same or similar parts in all the views.

A tire shoe embodying my invention may have the same general form as any ordinary flexible shoe or carcass forming an annular chamber adapted to contain an annular inflated inner tube or other form of cushion, and having flexible edge portions provided with faces either shouldered or otherwise formed to engage the usual fastening devices or members on a wheel rim.

My improved shoe is formed in a series of separable sections $a$ of the general form that would be produced by transversely dividing an ordinary shoe by radial cuts converting the shoe into approximately wedge-shaped sections or segments, each having end faces which are inclined relatively to each other so that the section gradually decreases in width from its tread portion to its two-part inner portion or base, the said end faces of each section being formed to abut against the end faces of adjacent sections.

Each section $a$ has fastener-engaging members 12, which are formed to engage the usual hooked clencher flanges constituting the shoe attaching or retaining devices on a wheel rim. The members 12 may be otherwise formed however to engage other forms of attaching devices on the wheel rim.

In the preferred embodiment of my invention here shown each section has a body portion 13 of any suitable material such as felt (which is preferred), or an elastic rubber composition such as is usually employed for tire shoes, or the well known combination of fabric and rubber composed of layers of so-called frictioned fabric and relatively thick surface layers of rubber.

One end of the body portion is preferably extended to form an arched flange 14 projecting from one of the end faces, and the inner surface of the body is enlarged at its opposite end portion to form a socket 15 shaped to receive and closely fit the flange 14 of an abutting section, the sections being thus interengaged and kept in circular alinement with each other.

Each of the two parts of the section base is provided with an internal groove 16 preferably rounded, said grooves receiving two metallic coupling rings 17 of the form in cross section shown by Fig. 2. The chief function of said rings is to permit the convenient assemblage of the sections in a circular series, the rings being supported side by side, suitably spaced apart, and the sections being placed thereon, one at a time, until they form a complete circular series. In Fig. 1 I show the shoe nearly built up in the manner described, two of the sections being omitted. The sections are sufficiently compressible to permit the last section to be crowded into the space left to receive it, the diameter of the coupling rings and the thickness of the sections being so proportioned that when all the sections are assembled, the sections cover the rings, and their abutting faces are in sufficiently close proximity to each other for all practical purposes, although the contact between adjacent abutting surfaces should be sufficiently loose or light to permit some separation between any two adjoining sections by the application of force tending to slide them away from each other on the rings. The flanges 14 are relatively thin and flexible, so that the flange of the section last applied to complete the series can be readily bent to cause it to enter the corresponding socket 15. The rings 17 constitute a simple means additional to the shoe sections, and independent of the wheel rim and of an inner tube, for coupling the sections together in an endless circular series. The sections connected by said coupling means constitute a tire structure adapted to be handled as a single unitary part, the coupling means extending across the joints between the sections. When the sections are assembled they are firmly interengaged against radial displacement by the flanges and sockets and by the rings 17.

Each section is provided with a wear-resisting, puncture-proof tread portion 19 composed of a dense and relatively rigid material of suitable tensile strength, and adapted to be molded to the desired shape. The body portion and tread portion are preferably united by interlocking dovetail tongues and grooves forming the contact surfaces of said portions. The tongues 20 on the body portion are separated from each other by grooves which receive the tongues 21 on the tread portion. The body portion is also provided with tongues 20ª which enter grooves formed in the edges of the tread portion. It will now be seen that each section *a* has a relatively rigid tread portion unit, a flexible body portion unit flexibly supporting the tread portion unit, and units of two fastener-engaging faces, so that when the sections are assembled they form a complete shoe adapted to be manipulated, secured and removed like an ordinary nonsectional shoe. It will also be seen that the tread portion units 19, while individually rigid or relatively so, collectively constitute a jointed flexible tread, each tread unit being flexibly supported by a body portion unit and movable to a limited extent toward and from the axis, so that while the tread portion is of relatively rigid, puncture-proof and wear-resisting material, it is not like a rigid continuous tire, but is adapted to yield locally. The relatively rigid tread portion 19 is attached only to the central portion of the flexible body and renders said central portion relatively rigid. The edge portions of the flexible body project from the tread portion, as shown by Figs. 2 and 3, so that their flexibility is unimpaired, and they are free to be moved toward and from each other to any extent that may be required. Owing to the fact that the central portion of the flexible body is relatively rigid, the flanges 14 and recesses 15 are confined more firmly than would be the case if all portions of the body were equally flexible, consequently the liability of excessive displacement of the flanges and of the walls of the recesses is reduced to the minimum.

The length of each tread unit should be so proportioned to the weight of the vehicle and its load that it does not exceed the length of the flat surface formed on the tread by contact with the road. The tread unit may be of compressed indurated pulp such as is used in making so-called paper car wheels, or it may be of a less rigid material, such as raw hide, or sole leather.

Having described my invention, I claim:

1. A tire shoe formed to contain an elastic annular cushion, and having members adapted to engage fastening devices on a wheel rim, said shoe being formed in separable approximately wedge-shaped sections collectively forming a sectional annular shoe, each section including units of said fastener-engaging members, and coupling means crossing the joints between the sections, and separably connecting said sections in an endless circular series, said means being additional to the sections and independent of the annular cushion and wheel rim, and permitting the handling of the tire as a single unitary part when removed from the wheel rim.

2. A tire shoe comprising separable approximately wedge-shaped sections collectively forming an annular shoe, having fastener-engaging members, units of which are formed on the sections, said sections being provided with grooves in the inner surfaces of their base portions, and continuous coupling rings occupying said grooves, and coupling the sections together in an endless circular series.

3. A tire shoe formed to contain an elastic annular cushion, and formed in separable approximately wedge-shaped sections, each composed of a flexible body having flexible edge portions and a relatively rigid tread portion united to the central portion of the body and rendering said portion relatively rigid, the edge portions of the shoe projecting with unimpaired flexibility from said tread portion, and having fastener-engaging members.

4. A tire shoe formed to contain an elastic annular cushion, and formed in separable approximately wedge-shaped sections, each composed of a flexible body having flexible edge portions and locking members on its central portion, and a relatively rigid tread portion united to the central portion of the body and having locking members interlocked with the locking members of the body, the flexible edge portions projecting with unimpaired flexibility from the tread portion and having fastener-engaging members.

5. A tire shoe formed to contain an elastic annular cushion, and formed in approximately wedge-shaped sections, each composed of a flexible body having flexible edge portions, and a wear-resisting tread portion of relatively rigid material united to the central portion of the body and rendering said portion relatively rigid, the edge portions of the sections projecting with unimpaired flexibility from said tread portion and having fastener-engaging members, one side of each section being provided with a projecting flange and the opposite side with a flange-receiving recess, said flanges and the walls of said recesses being in close proximity to said rigid tread portions and confined thereby against excessive displacement.

6. As an article of manufacture, a tire-shoe section having end faces inclined relatively to each other, units of fastener-engaging members at its base portion, and internal grooves adapted to receive continuous coupling rings.

In testimony whereof I have affixed my signature, in presence of two witnesses.

CHARLES F. NICKERSON.

Witnesses:
  H. A. RAHN,
  E. BATCHELDER